UNITED STATES PATENT OFFICE.

CARL V. PETRAEUS, OF CAMDEN, NEW JERSEY, ASSIGNOR TO THE UNITED STATES CHEMICAL COMPANY, OF SAME PLACE.

SOLUTION OF ACID PHOSPHATES.

SPECIFICATION forming part of Letters Patent No. 313,369, dated March 3, 1885.

Application filed June 27, 1884. (No specimens.)

*To all whom it may concern:*

Be it known that I, CARL V. PETRAEUS, of Camden, in the county of Camden, State of New Jersey, have invented a new and useful Improvement in Acid Phosphates, of which the following is a clear, full, and exact description.

The great importance of phosphates to the animal economy being now universally recognized, it becomes a matter of the first importance to prepare it in a manner the least likely to affect injuriously any of the organs of the human body.

The use of phosphate of lime has been found to be objectionable from its liability to produce calcareous deposits in the bladder and kidneys.

My invention consists in a combination of free phosphoric acid with the phosphate of soda, about two molecules of phosphoric acid to one atom of soda.

I produce my solution as follow: To one hundred parts of clean pure bone-ash, (or its equivalent in bone-black,) I add one hundred parts of sulphuric acid, of 49° Baumé, which I prefer first to dilute to 20° or 25° Baumé by water. By leaching this mass, I produce a solution containing acid phosphate of lime and phosphoric acid, besides smaller quantities of phosphate of iron, magnesia, soda, and potassa, ingredients found in and belonging to animal bone, while the gypsum produced by the sulphuric acid and most of the lime in the bone is left behind as an insoluble mass. The amount of lime in the solution varies somewhat, according to the time the acid and bone have been mixed together, and to some other accidental circumstances; and therefore I carefully determine the amount of lime in the solution, and to each twenty-eight parts of lime in combination with the phosphoric acid I add one hundred and sixty-one parts Glauber's salt. This solution I separate from the precipitate of lime by filtration or decantation, and prepare it so that its specific gravity will be at about 1.15.

I am aware of the existence of three different compounds of soda and normal phosphoric acid, viz: trisodic phosphate, disodic-hydric phosphate, and monosodic-dihydric phosphate; but neither of these is identical with my solution, which is nearest a solution of a compound of equal equivalents of hydrated phosphoric acid and monosodic-dihydric phosphate; or it is about monosodic penta-hydro phosphate, ($P_2O_8NaH_5$.)

Having thus described my invention, what I claim as my invention, and desire to secure by Letters Patent, is—

As an improved solution of acid phosphates. the combination of phosphate of soda and phosphoric acid, consisting of dihydrogen, sodic phosphate, phosphoric acid, and water, in about the proportions herein stated.

CARL V. PETRAEUS.

Witnesses:
   H. B. APPLEWHAITE,
   T. WALTER FOWLER.